Patented Jan. 8, 1952

2,581,712

UNITED STATES PATENT OFFICE 2,581,712

PROCESS OF EXTRACTING OXYGEN COMPOUNDS FROM HYDROCARBON MIXTURE

Walter Rottig, Oberhausen-Sterkrade-Nord, Germany, assignor to Ruhrchemie Aktiengesellschaft, Oberhausen-Holton, Germany, a joint-stock company of Germany No Drawing. Application August 8, 1949, Serial No. 109,226. In France August 12, 1948

2 Claims. (Cl. 260—450)

This invention relates to the treatment of mixtures of hydrocarbons and quite particularly aliphatic hydrocarbons, with oxygenated compounds.

It has particular reference to the treatment of mixtures of aliphatic hydrocarbons such as result for instance from the catalytic hydrogenation of carbon monoxide, for the purpose of separating the oxygenated compounds. It is known that particularly great quantities of oxygenated compounds are formed in this reaction if iron catalysts are present. Apart from the process of hydrogenation of carbon monoxide, mixtures of hydrocarbons with oxygenated compounds are obtained also in the process of additive combination of water gas with unsaturated hydrocarbons, in the process of oxidizing paraffin and in other chemical processes. Hydrocarbon mixtures of different origin sometimes contain a considerable percentage of oxygenated compounds.

It is desirable to extract these oxygenated compounds from such mixtures, since they often are valuable by-products readily selling at high profit. Extraction of the oxygenated compounds is desirable also in order to render the hydrocarbon mixtures, and quite especially those that result in the hydrogenation of carbon monoxide, fit for further useful treatment.

I have found that it is possible to selectively extract in a simple manner and with a fair yield oxygenated compounds from mixtures of aliphatic hydrocarbons, and more especially from the mixtures resulting as primary products from the hydrogenation of carbon monoxide in the presence of iron catalysts, if these mixtures are treated with a mixture of a polyvalent alcohol which under the conditions of the extraction process is liquid, and water or a low-molecular monovalent alcohol.

I have found that a mixture of glycol, glycerine, monomethyl glycol, dimethyl glycol or trimethylene glycol with water or with a low-molecular monovalent alcohol is a particularly useful extraction agent, because the presence of water or of a low-molecular monovalent alcohol considerably increases the dissolving capacity of glycol or its homologues or derivatives for oxygenated compounds and also their selectivity with regard to these compounds.

I have found it preferable to admix to the glycol a fraction, boiling within the range of 50° and 70° C., which can be recovered by distillation from the products of a hydrogenation of carbon monoxide in the presence of iron or cobalt catalysts. This way of proceeding offers the advantage that no foreign compounds need be used in the extraction and in the further treatment of the oxygenated compounds.

In the industrial operation of the process according to this invention the hydrocarbon mixtures containing oxygen compounds are passed for instance through several extraction towers mounted in serial stepwise arrangement. In order to obtain a uniform and intensive mixing with the extraction agent, it is advisable to fill the towers with suitable liquid-distributing devices (filling bodies).

In operating in this manner, I succeeded in extracting in four stages from a mixture of aliphatic hydrocarbons having an OH number of 90–100 and a CO number of 8–10 and containing also small proportions of other oxygen compounds, all the oxygenated compounds to the extent that the final product of the last stage had no OH and CO numbers any more. In order to remove the last traces of the polyvalent alcohols and of such low molecular alcohols, for instance methyl alcohol, as may have been added, a subsequent treatment of the hydrocarbon mixture with water has been found advisable.

The separation of the extracted oxygen compounds from the solvent, for instance the glycol, is effected by simple distillation. Insofar as during this treatment no mixture of constant boiling point (azeotropic mixture) is formed, the several oxygenated products are obtained in a high degree of purity. The oxygen compounds which distil over at a temperature above the boiling point of the extraction agent (for instance the glycol), are preferably separated by distillation in vacuo in order to avoid decomposition and polymerization.

*Example 1.*—A two-stage extraction apparatus having an operative volume of 800 ccm. per stage was filled with sintered porous slabs. The first stage was filled with pure glycol, the second stage contained a mixture of equal parts, by volume, of glycol and methyl alcohol. Through this apparatus were passed 150 ccms. per hour of a product of carbon monoxide hydrogenation having an OH number of 90 and an initial boiling point of 135° C. The hydrocarbon mixture was fed to the two stages at the bottom, being withdrawn at the top. After escaping from the second stage, the hydrocarbon mixture was washed with water to remove residual glycol and methyl alcohol. After the washing it only showed an OH number of 13.

*Example 2.*—With a hydrocarbon fraction originating from the thermic cracking of petroleum, which boiled between 150 and 220° C. and contained olefines, watergas was combined additively in a well known manner under pressure above atmospheric and at a temperature above normal in the presence of a cobalt catalyst. Subsequent hydrogenation brought about the conversion of the aldehydes which had formed, into the corresponding alcohols with the aid of the same catalyst and at further raised temperature under addition of hydrogen. The final product contained 35% alcohols, 5% olefines and 60% saturated hydrocarbons.

For the purpose of extracting the alcohols formed, the mixture was treated in a four-stage extraction apparatus, in which every stage had an operative volume of 800 ccms. and was filled with Raschig rings 5 mm. in diameter. The first extraction stage contained pure glycol, the second stage was filled with a mixture of 2 parts glycol and 1 part methyl alcohol. The third stage contained a mixture of equal parts of glycol and methyl alcohol, the last stage contained water in order to remove from the escaping hydrocarbon mixture the residual glycol and methyl alcohol.

In this manner about 80% of the alcohols were separated from the mixture and recovered in practically pure condition.

Various changes may be made in the manner of proceeding and in the substances used according to the foregoing description, without departing from the invention or sacrificing the advantages thereof.

I claim:

1. A process for the extraction of oxygen-containing compounds from reaction mixtures containing said oxygen-containing compounds and hydrocarbons which comprises acting on said reaction mixtures in a first stage with a polyvalent alcohol which is liquid under the conditions prevailing during the process, thereafter acting on the product of said first stage in a second stage with a mixture of polyvalent alcohol and a low molecular weight monovalent alcohol and finally treating the product of said second stage with water to remove any residual polyvalent alcohol and low molecular weight monovalent alcohol therefrom.

2. The process of claim 1 wherein the low molecular weight alcohol is methyl alcohol present in the proportion of 1 to 2 parts to each part of polyvalent alcohol.

WALTER ROTTIG.

REFERENCES CITED

The following references are of record in the file of this patent:

UNITED STATES PATENTS

| Number | Name | Date |
|---|---|---|
| 2,452,121 | Grahame | Oct. 26, 1948 |
| 2,470,782 | McGrath et al. | May 24, 1949 |